(12) United States Patent
Shin

(10) Patent No.: US 12,167,067 B2
(45) Date of Patent: Dec. 10, 2024

(54) DISPLAY DEVICE AND METHOD OF OPERATING THE SAME

(71) Applicant: LG ELECTRONICS INC., Seoul (KR)

(72) Inventor: Chiho Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 17/650,501

(22) Filed: Feb. 9, 2022

(65) Prior Publication Data

US 2023/0139280 A1     May 4, 2023

(30) Foreign Application Priority Data

Nov. 2, 2021   (KR) .......................... 10-2021-0149237

(51) Int. Cl.
    *H04N 21/4223*     (2011.01)
    *H04N 21/4363*     (2011.01)
    *H04N 21/81*     (2011.01)

(52) U.S. Cl.
    CPC ... *H04N 21/4223* (2013.01); *H04N 21/43635* (2013.01); *H04N 21/8173* (2013.01)

(58) Field of Classification Search
    CPC ......... H04N 21/4223; H04N 21/43635; H04N 21/8173; H04N 21/44227; H04N 21/4882;

(Continued)

(56) References Cited

U.S. PATENT DOCUMENTS

| | | | |
|---|---|---|---|
| 10,951,507 | B1 | 3/2021 | Slavin |
| 2008/0271074 | A1* | 10/2008 | Bae ..................... H04N 21/4135 725/38 |

(Continued)

FOREIGN PATENT DOCUMENTS

| | | |
|---|---|---|
| CN | 111491190 | 8/2020 |
| CN | 113497884 | 10/2021 |

(Continued)

OTHER PUBLICATIONS

European Patent Office Application Serial No. 22150270.1, Extended Search Report dated Jun. 30, 2022, 8 pages.

(Continued)

*Primary Examiner* — Nhan T Tran
(74) *Attorney, Agent, or Firm* — LEE, HONG, DEGERMAN, KANG & WAIMEY

(57) ABSTRACT

A display device includes a display, a network interface configured to wirelessly communicate with a camera device or a server, an external device interface configured to communicate with the camera device through high definition multimedia interface-consumer electronics control (HDMI-CEC), and a controller configured to display a camera service list including a plurality of camera service items respectively corresponding to a plurality of camera service apps on the display upon connection with the camera device, to transmit, to the camera device, an execution request of a camera service app corresponding to a selected camera service item in response to selection of any one of the plurality of camera service items, and to switch external input to the camera device according to the execution request.

17 Claims, 13 Drawing Sheets

(58) Field of Classification Search
CPC ......... H04N 21/4438; H04N 21/42684; H04N 21/43615; H04N 23/661
See application file for complete search history.

(56) References Cited

U.S. PATENT DOCUMENTS

| | | |
|---|---|---|
| 2011/0157479 A1 | 6/2011 | Higuchi et al. |
| 2013/0007817 A1* | 1/2013 | Park .................. H04N 21/4112 725/81 |
| 2014/0157387 A1 | 6/2014 | Lee et al. |
| 2014/0152777 A1 | 7/2014 | Galor et al. |
| 2019/0149871 A1 | 5/2019 | Yoshizawa et al. |
| 2020/0213557 A1* | 7/2020 | Jeong ................. H04N 21/6437 |

FOREIGN PATENT DOCUMENTS

| | | |
|---|---|---|
| EP | 3678377 | 7/2020 |
| GB | 2509829 | 7/2014 |
| WO | 2018051469 | 3/2018 |

OTHER PUBLICATIONS

Japan Patent Office Application Serial No. 2022-016794, Office Action dated Apr. 4, 2023, 2 pages.
IP Australia Application Serial No. 2022204849, Office Action dated Mar. 10, 2023, 7 pages.
European Patent Office Application Serial No. 22150270.1, Office Action dated Jun. 28, 2024, 6 pages.

* cited by examiner

FIG. 13

| Opcode | Value | Description | Parameters | Parameter description | Response |
|---|---|---|---|---|---|
| <Vendor Command> | 0x89 | Allows vendor specific commands to be sent between two devices | [vendor Specific Data] | Vendor specific command or data The maximum length of the [Vendor Specific Data] in the message shall not exceed 14 data blocks | Vendor Specific |

FIG. 14

| Requirement | Format | Value | Definition | Additional Information | |
|---|---|---|---|---|---|
| Mandatory | unit8s | utf8 byte array | Wi-Fi AP Data version 2 | AP Info: SSID(String)+ 0x0000(NULL) + PW(String) + 0x0000(NULL) + Security Type(String) + 0x0000(NULL) + Is Hidden(String) | ~1400 |
| | | | | *Wired Lan: "WIRED CONNECTED" + 0x0000(NULL) + "" + 0x0000(NULL) + "NONE" + 0x0000(NULL) + "FALSE"<br><br>*Security AP (not supported pw): SSID(String) + 0x0000(NULL) + "" + 0x0000(NULL) + Security Type(stirng) + 0x0000(NULL) + Is Hidden(String)<br><br>*Security Type: "NONE" \| "PSK" \| "WEP" \| "EAP"<br><br>*Is Hidden: "TRUE" \| "FALSE" | |

DISPLAY DEVICE AND METHOD OF OPERATING THE SAME

CROSS-REFERENCE TO RELATED APPLICATIONS

Pursuant to 35 U.S.C. § 119(a), this application claims the benefit of earlier filing date and right of priority to Korean Patent Application No(s). 10-2021-0149237, filed on Nov. 2, 2021, the contents of which are all hereby incorporated by reference herein in its entirety.

BACKGROUND

The present disclosure relates to a display device and a method of operating the same.

Digital TV services using wired or wireless communication networks are becoming common. Digital TV service can provide a variety of services that could not be provided in the conventional analog broadcasting service.

For example, IPTV (Internet Protocol Television), which is a type of digital TV service, and smart TV service provide bidirectionality that allows a user to actively select a type of viewing program and a viewing time. IPTV, smart TV service may provide a variety of additional services, such as Internet search, home shopping, and online games based on this bidirectionality.

In addition, recent TVs provide services associated with a camera.

However, conventionally, in order to provide camera services (e.g., multi-party video call, AI function or AR function), the platform of TV needs to be changed or there are many restrictions on a system on chip (SoC) of TV.

In addition, when an external camera is installed on a TV product, there was a difficulty in development of camera services and coping with bidirectional communication platform. That is, the camera provided only an A/V signal and did not support any communication.

In addition, whenever a new camera service is provided, TV needs to be upgraded.

In addition, conventionally, a list of peripherals was provided for connection of wireless products and connection was established by user selection. In this case, separate operation such as user selection is necessary, thereby causing user inconvenience.

SUMMARY

An object of the present disclosure is to minimize change of a platform of a display device for provision of a camera service and to eliminate restrictions on a storage space according to installation of a camera service app.

Another object of the present disclosure is to implement bidirectional communication with a camera device mounted outside a display device.

Another object of the present disclosure is to automatically perform network setting with a camera device.

A display device according to an embodiment of the present disclosure includes a display, a network interface configured to wirelessly communicate with a camera device or a server, an external device interface configured to communicate with the camera device through high definition multimedia interface-consumer electronics control (HDMI-CEC), and a controller configured to display a camera service list including a plurality of camera service items respectively corresponding to a plurality of camera service apps on the display upon connection with the camera device, to transmit, to the camera device, an execution request of a camera service app corresponding to a selected camera service item in response to selection of any one of the plurality of camera service items, and to switch external input to the camera device according to the execution request.

BRIEF DESCRIPTION OF THE DRAWINGS

FIG. 13 is a view illustrating a method of transmitting network setting data transmitted to a camera device through HDMI-CEC according to an embodiment of the present disclosure.

FIG. 14 is a view illustrating the format of network setting data according to an embodiment of the present disclosure.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
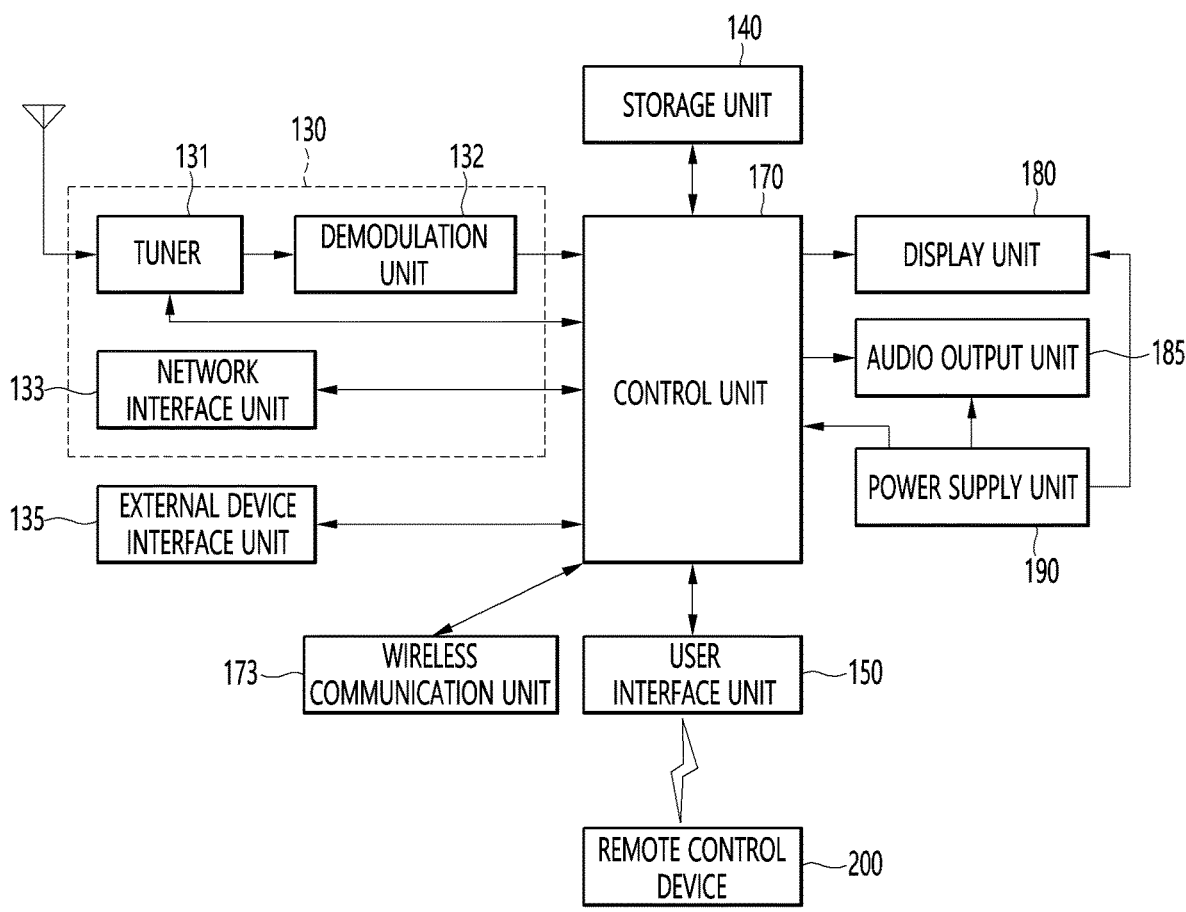
FIG. 1 is a block diagram illustrating a configuration of a display device according to an embodiment of the present disclosure.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
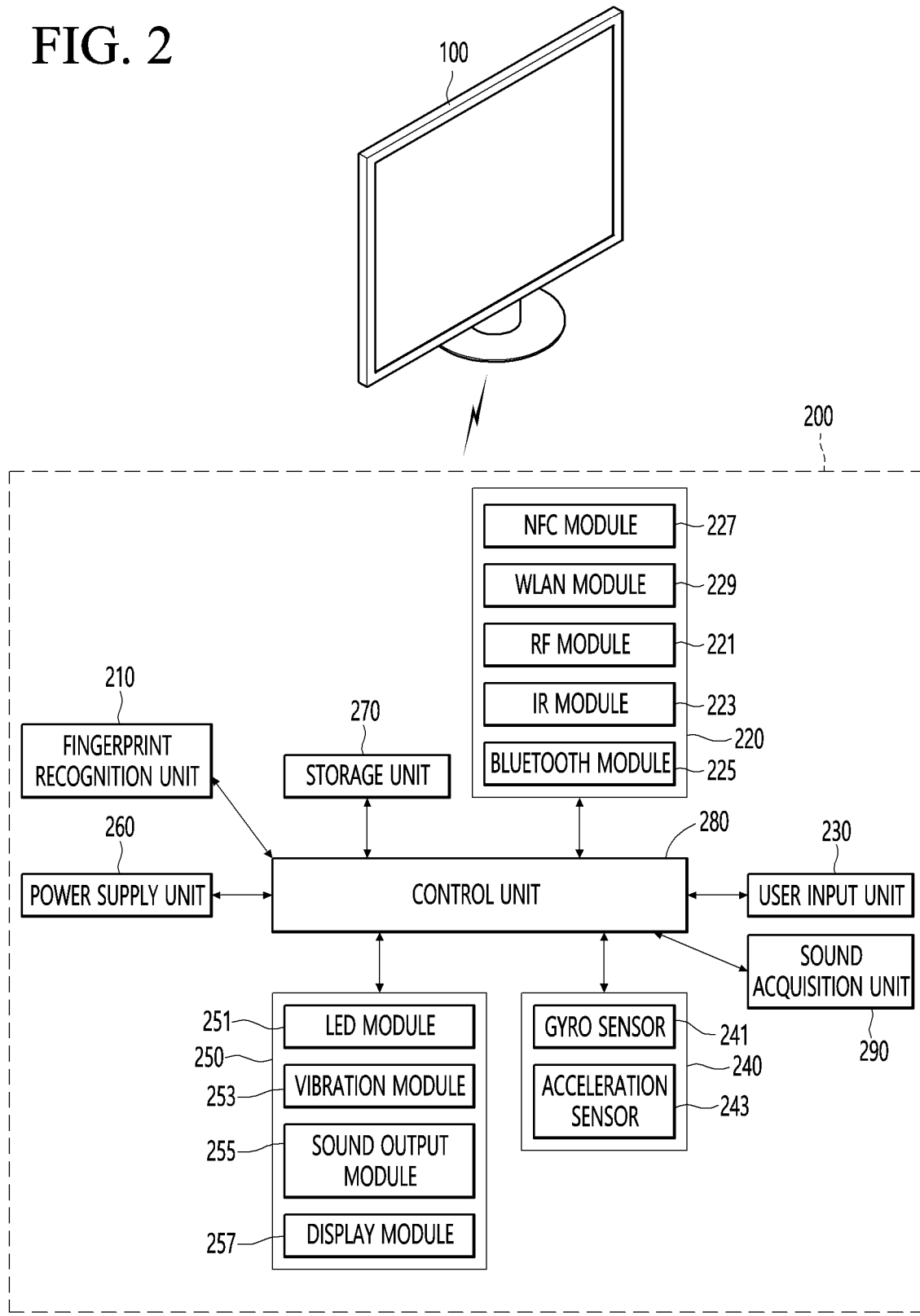
FIG. 2 is a block diagram illustrating a remote control device according to an embodiment of the present disclosure.
Figure 3:
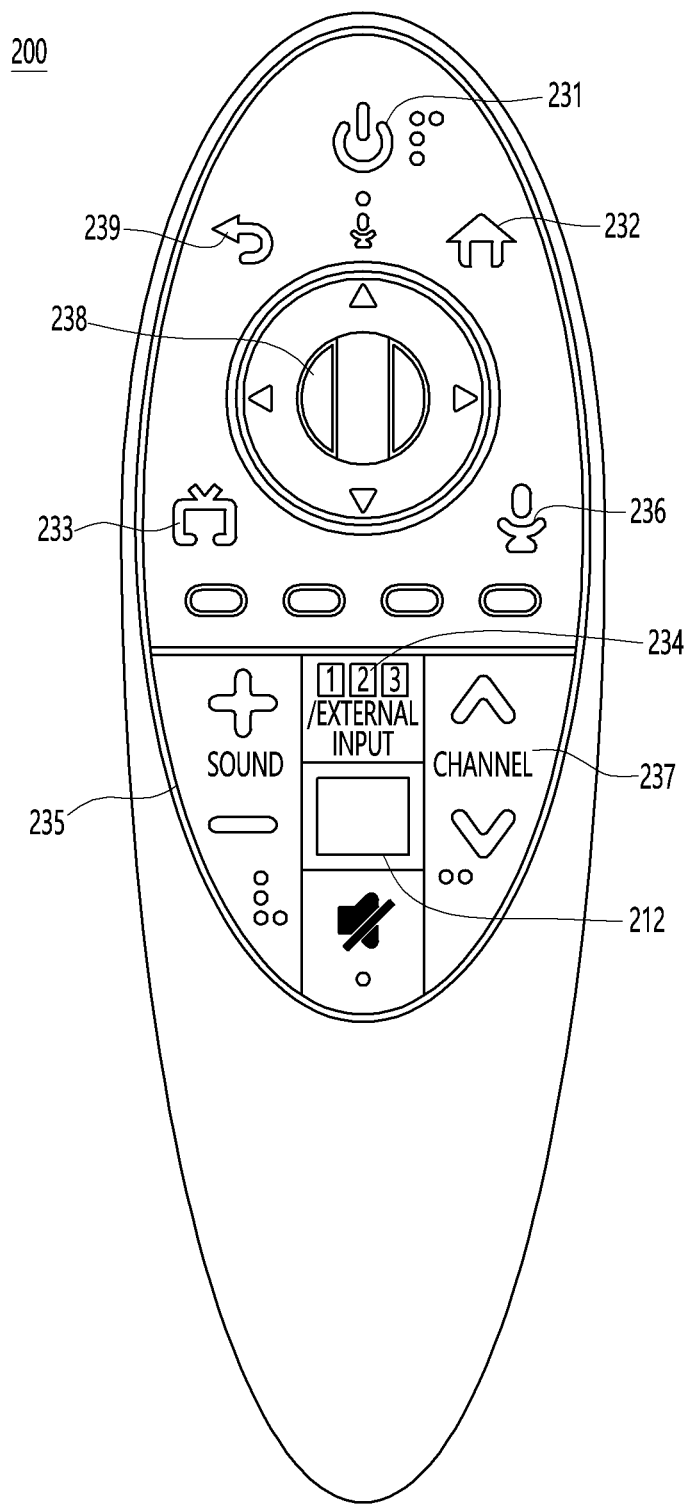
FIG. 3 is a view illustrating an actual configuration of a remote control device according to an embodiment of the present disclosure.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, referring to FIG. 2, if the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice. The sound acquisition unit 290 can include at least one microphone and obtain voice through the microphone 291.

Figure 4:
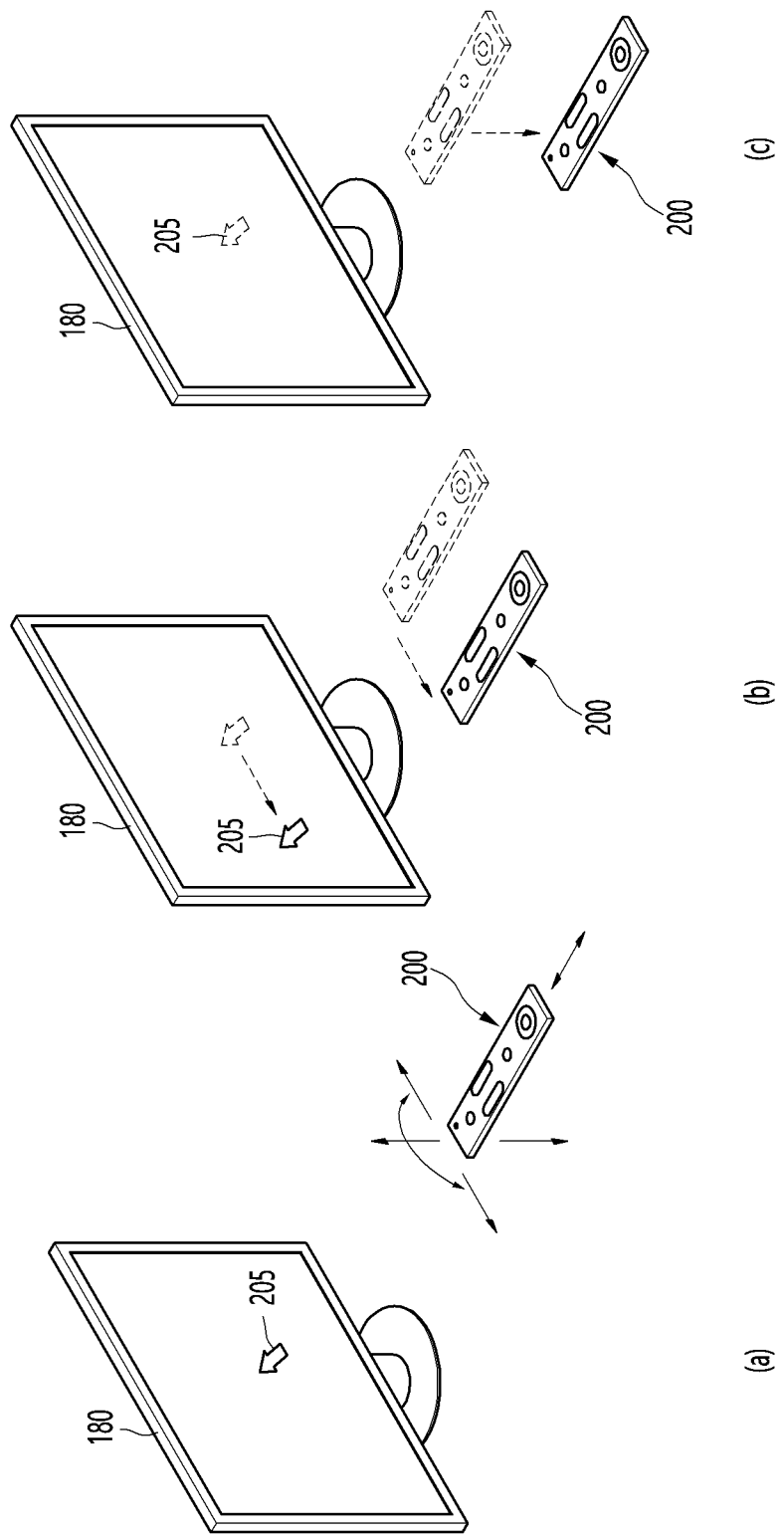
FIG. 4 is a view showing an example of utilizing a remote control device according to an embodiment of the present disclosure.

FIG. 4 is a view of utilizing a remote control device according to an embodiment of the present invention. FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
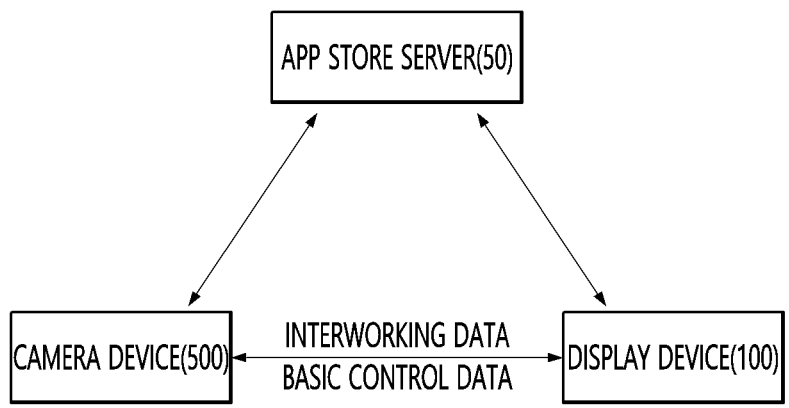
FIG. 5 is a view illustrating a configuration of a network interworking camera system according to an embodiment of the present disclosure.

FIG. 5 is a view illustrating a configuration of a network interworking camera system according to an embodiment of the present disclosure.

The network interworking camera system 5 may include a camera device 500, a display device 100 and an app store server 50.

The camera device 500 may exchange basic control data with the display device 100 through HDMI CEC (High Definition Multimedia Interface Consumer Electronics Control) standard.

The basic control data may include a network setting value between the camera device 500 and the display device 100. The network may be a Wi-Fi network.

The network setting value may include a service set identifier (SSID) and a password.

The camera device 500 may exchange interworking data with the display device 100 through the Wi-Fi standard.

The interworking data may include a software development kit (SDK) for providing a camera service.

The display device 100 may receive a camera service list from the app store server 50. The camera service list may include camera service items which may be provided by the camera device 500 connected with the display device 100. Each of the camera service items may be a camera service app.

Figure 6:
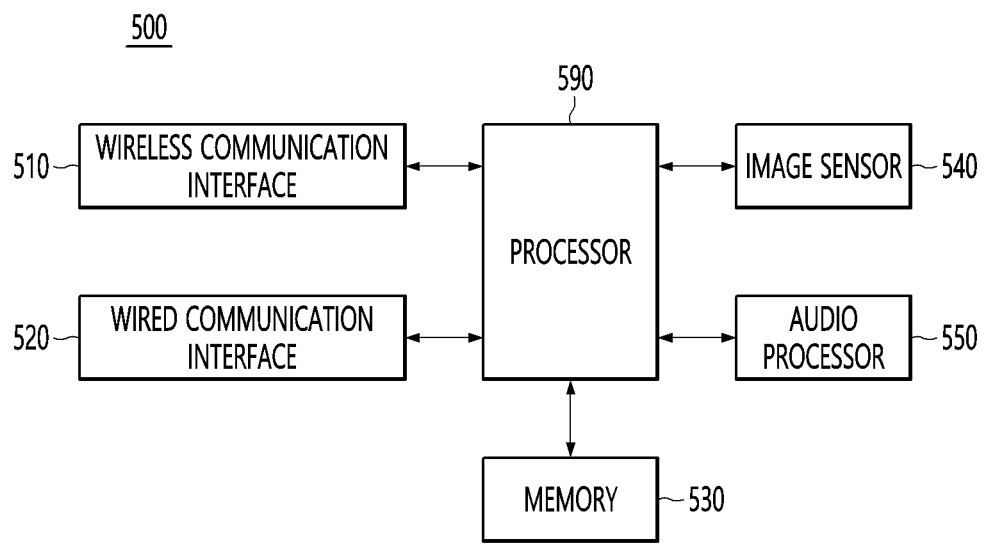
FIG. 6 is a block diagram illustrating a configuration of a camera device according to an embodiment of the present disclosure.

FIG. 6 is a block diagram illustrating a configuration of a camera device according to an embodiment of the present disclosure.

Referring to FIG. 6, the camera device 500 may include a wireless communication interface 510, a wired communication interface 520, a memory 520, an image sensor 540, an audio processor 550 and a processor 590.

The wireless communication interface 510 may perform wireless communication with the app store server 50 and the display device 100.

The wireless communication interface 510 may include a Wi-Fi module.

The wired communication interface 520 may be connected with the external device interface unit 135 of the display device 100.

The wired communication interface 520 may include a HDMI output terminal. The wired communication interface 520 may transmit information to the display device 100 through HDMI-CEC, and receive information from the display device 100.

The memory 530 may store program data, video data and audio data necessary to install the app of the camera service.

The image sensor 540 may read information on a subject and transform it into an electrical image signal. The transformed image signal may be transmitted to the display device 100 through the wired communication interface 520.

The audio processor 550 may process audio acquired through a microphone (not shown) and transmit the processed audio to the display device 100.

The processor 590 may control overall operation of the camera device 500.

The processor 590 may receive program necessary to install a camera service app from the app store server 50 and install the camera service app based on the received program data.

Figure 7:
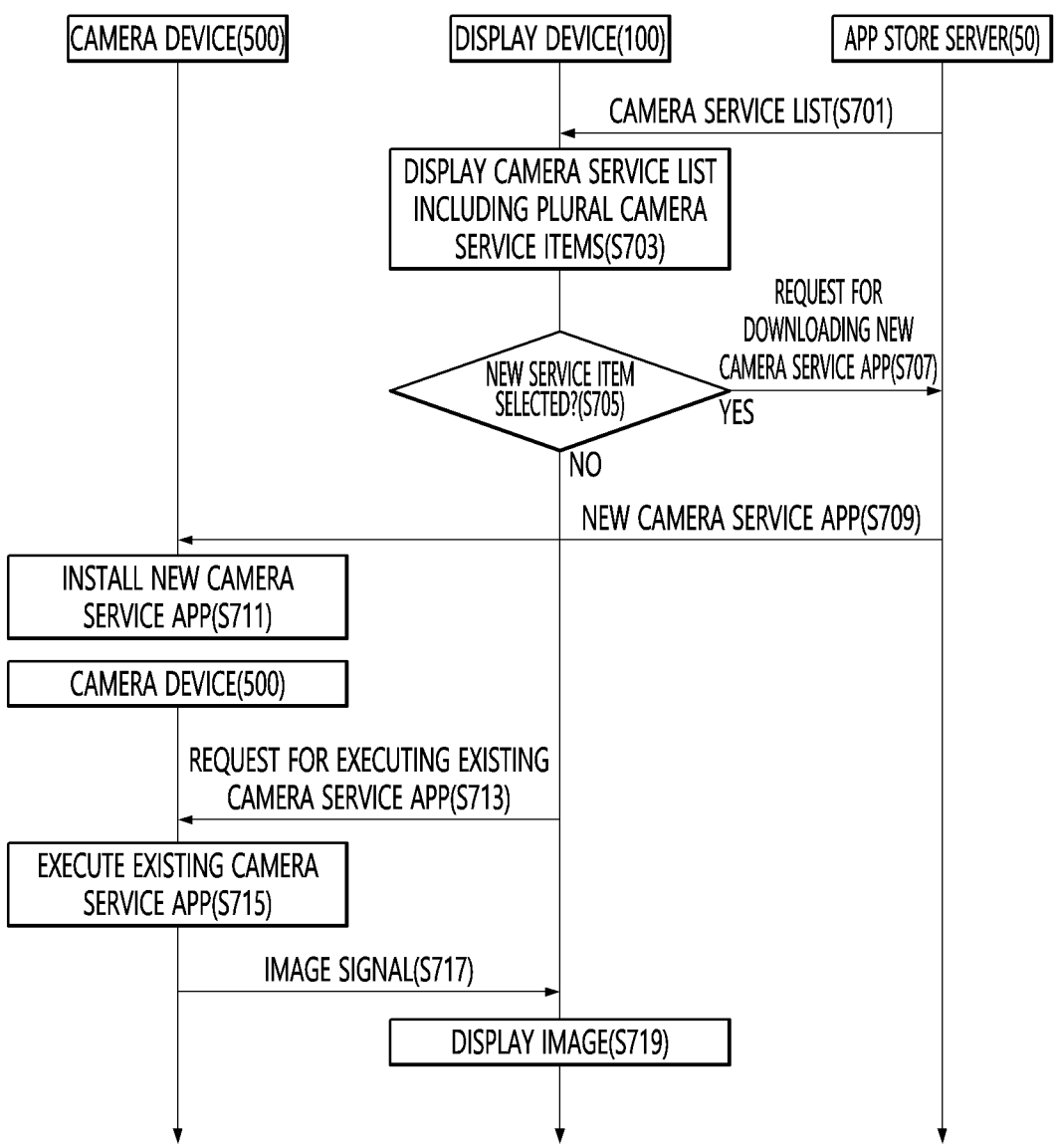
FIG. 7 is a ladder diagram illustrating a method of operating a network interworking camera system according to an embodiment of the present disclosure.

FIG. 7 is a ladder diagram illustrating a method of operating a network interworking camera system according to an embodiment of the present disclosure.

In FIG. 7, it is assumed that the camera device 500 and the display device 100 are connected by wire through the HDMI-CEC standard and are wirelessly connected to a network.

Wireless network connection may be Wi-Fi network connection.

The camera device 500 may be mounted at an upper end of the display device 100, but the position thereof is merely an example.

Referring to FIG. 7, the control unit 170 of the display device 100 receives a camera service list from the app store server 50 through the network interface unit 133 (S701).

The network interface unit 133 may include a Wi-Fi module. When the display device 100 and the camera device 500 are connected, the control unit 170 may receive the camera service list which may be provided by the camera device 500.

The camera service list may include a plurality of camera service items respectively corresponding to a plurality of camera service apps.

The camera service apps may include a home training app, a video call app, a photo/video shooting app.

The camera service list may include an item corresponding to a camera service app previously executed on the display device 100.

In another embodiment, the control unit 170 may receive the camera service list from the camera device 500 as connection with the camera device 500 is established.

The camera service list may further include a new service item. The new service item may be a camera service item which may be newly provided through the camera device 500.

The control unit 170 of the display device 100 displays the camera service list including a plurality of camera service items on the display unit 180 (S703).

The control unit 170 of the display device 100 determines whether the new service item is selected from the plurality of camera service items (S705).

When the new service item is selected, the control unit 170 of the display device 100 transmits, to the app store server 50, a request for downloading a new camera service app corresponding to the new service item to the camera device 500 (S707).

That is, the control unit 170 may transmit, to the app store server 50, a request for installing the new camera service app to the camera device 500 through the network interface unit 133.

The app store server 50 transmits, to the camera device 500, program data necessary to install the new camera service app in response to the request received from the display device 100 (S709).

The processor 590 of the camera device 500 installs the new camera service app based on the program data received from the app store server 50 (S711).

The camera device 500 may download the program data for installing the new camera service app from the app store server 50 and install the new camera app based on the program data.

Meanwhile, the control unit 170 of the display device 100 transmits an execution request to the camera 50 when the execution request of an existing camera service app is received (S713).

The execution request of the camera service app may be a request for switching external input.

That is, the control unit 170 may switch external input to the camera device 500 according to the execution request of the camera service app while displaying an image received from a Live TV or a set-top box or an image received from an external device through HDMI.

The processor 590 of the camera device 500 executes the existing camera service app according to the received execution request (S715), and transmits an image signal to the display device 100 through the wired communication interface 520 according to execution of the camera service app (S717).

The wired communication interface 520 may be connected with the external device interface unit 135 of the display device 100 through a HDMI cable.

The image signal may be a signal captured by the image sensor 540 of the camera device 500.

The control unit 170 of the display device 100 displays an image based on the image signal received from the camera device 500 through the display unit 180 (S719).

Figure 8:
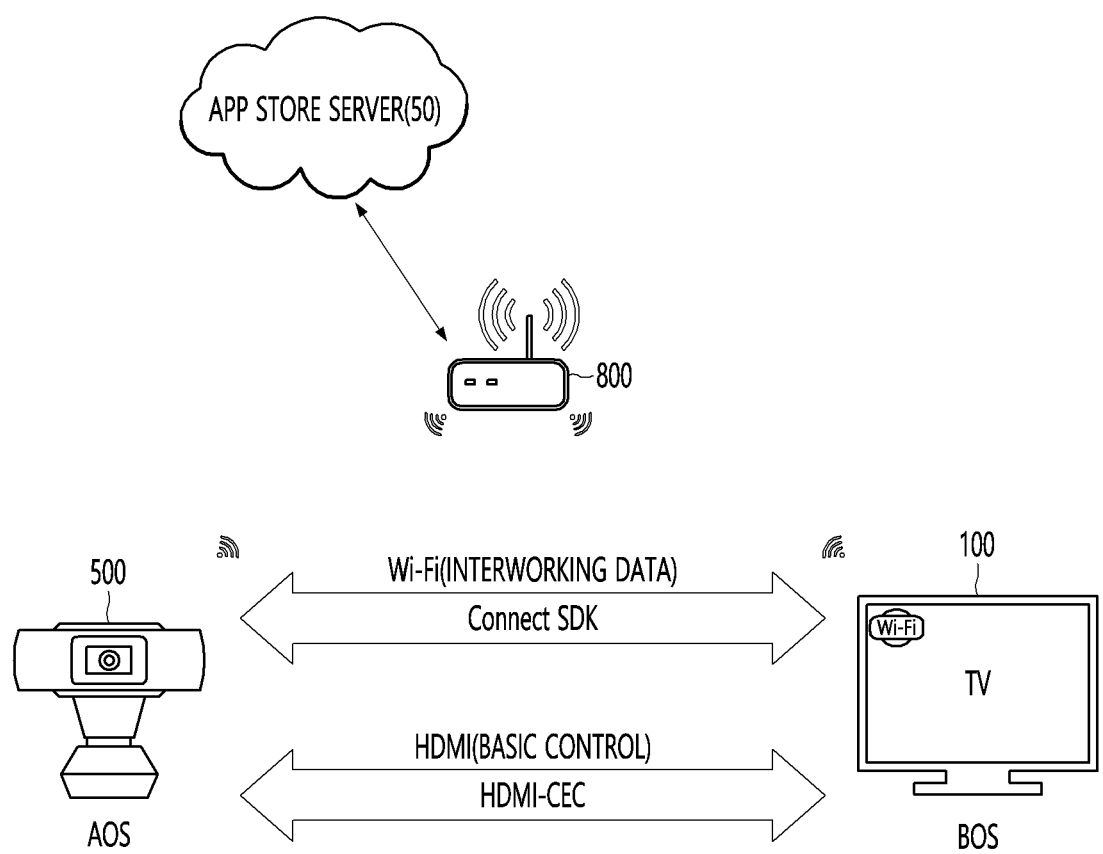
FIG. 8 is a view illustrating an interworking process between a camera device and a display device according to an embodiment of the present disclosure.

FIG. 8 is a view illustrating an interworking process between a camera device and a display device according to an embodiment of the present disclosure.

Referring to FIG. 8, the camera device 500 and the display device 100 may be connected through a HDMI cable, and the camera device 500 may transmit video and audio to the display device 100 through the HDMI cable.

Each of the camera device 500 and the display device 100 may perform data communication through a network module. The network module may be a Wi-Fi module.

Each of the camera device 500 and the display device 100 may be connected to the app store server 50 through a router 800.

The operating system of the camera device 500 may be A OS and the operating system of the display device 100 may be B OS, which may be different from each other.

The display device 100 may perform basic control of the camera device 500 through the HDMI-CEC standard. The display device 100 may receive identification information of the camera device 500 through the HDMI-CEC standard, and recognize the camera device 500 based on the received identification information.

The display device 100 may transmit, to the camera device 500, network setting data of the router wirelessly connected thereto through the HDMI-CEC standard. The network setting data may include an SSID and a password. The camera device 500 may access the router through the network setting data and thus perform wireless communication with the display device 100.

The display device 100 may switch external input to the camera device 500 according to execution of the camera service app.

The display device 100 may transmit, to the camera device 500, a 4-directional key control command received from the remote control device 200 through the HDMI-CEC standard.

The display device 100 and the camera device 500 exchange interworking data through the Wi-Fi standard.

For example, the display device 100 may transmit, to the camera device 500, coordinates of a pointer controlled according to movement of the remote control device 200 through the Wi-Fi module.

The camera device 500 may transmit, to the display device 100, information on a camera service app installed in the camera device 500, a remaining storage space and app download progress and information on installation of a new camera service app through the Wi-Fi module.

The camera device 500 may transmit an event generated when executing the camera service app to the display device 100 through the Wi-Fi module. For example, when the camera service app is a video call app, a video call signal may be an event.

In this way, interworking data having a small data capacity may be exchanged through the Wi-Fi module and data having a large data capacity, such as video data, may be transmitted to the display device 100 through HDMI.

Therefore, data exchange may be performed rapidly and efficiently.

Figure 9:
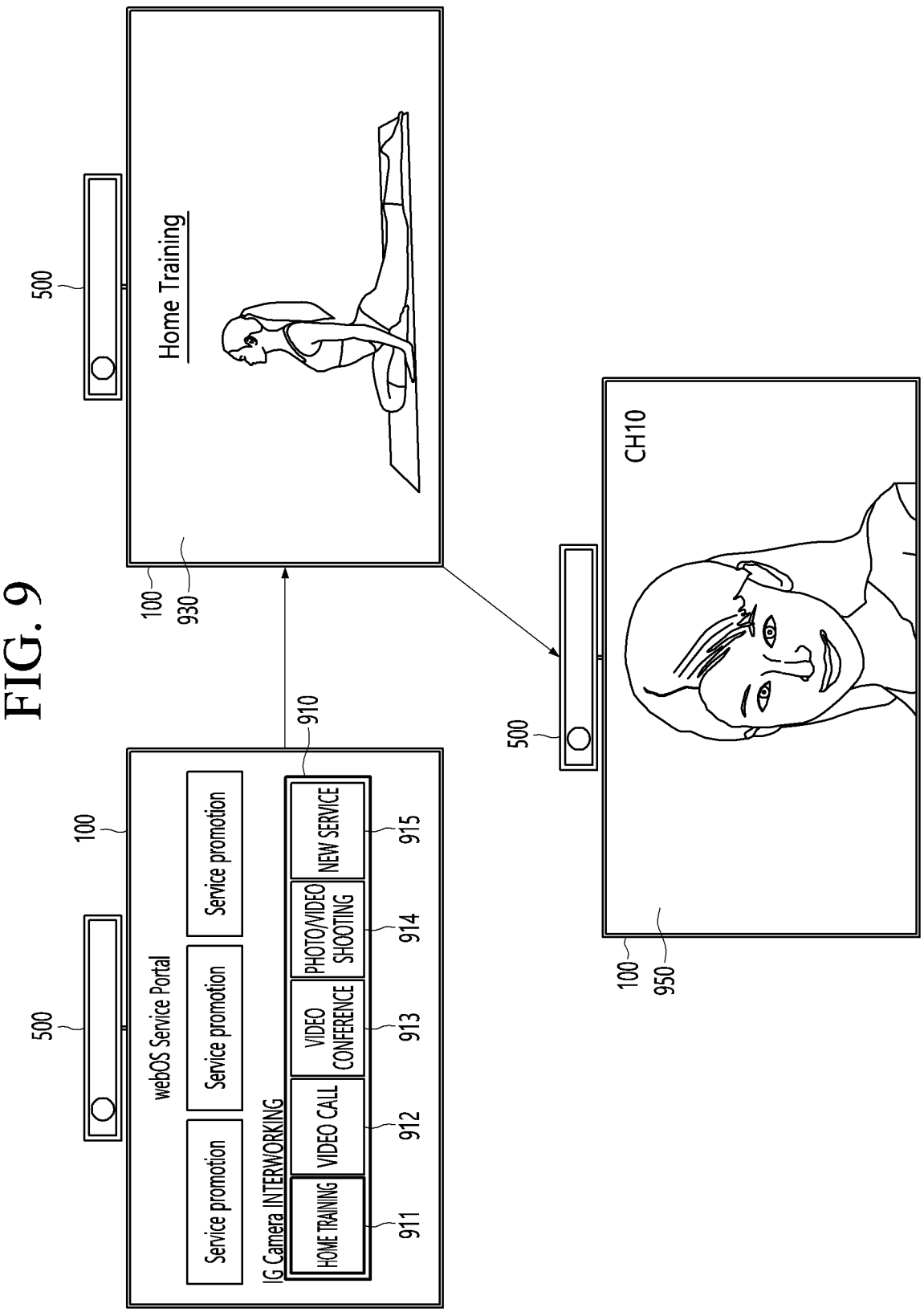
FIG. 9 is a view illustrating an example of providing a camera service list and switching external input to a camera device according to an embodiment of the present disclosure.

FIG. 9 is a view illustrating an example of providing a camera service list and switching external input to a camera device according to an embodiment of the present disclosure.

The display device 100 may include a camera service list 910 including a plurality of camera service items 911 to 915.

Each item may have the form of an icon, but this is merely an example.

The display device 100 may display the camera service list 910 when the camera device 500 is connected.

The plurality of camera service items 911 to 915 may correspond to camera service apps, respectively.

The first camera service item 911 may be a home training app, a second camera service item 912 may be a video call app, a third camera service item 913 may be a video conference app, a fourth camera service item 914 may be a photo/video shooting app, and a fifth camera service item 915 may be an item for installing a new service app.

The first to fourth camera service items 911 to 914 may be items previously provided through the display device 100 by interworking with the camera device 500.

When a command for selecting the first camera service item 911 is received, the display device 100 may switch external input to the camera device 500. The display device 100 may display an image 930 based on an image signal received from the camera device 500 through the HDMI cable.

The image 930 may be an execution screen of a home training app and may include an image captured by the camera device 500.

The display device 100 may control the home training app according to the command received from the remote control device 200.

The display device 100 may display a content image 950 which is being displayed before providing the camera service list 910 according to a command for ending external input of the camera device 500.

According to the embodiment of the present disclosure, a user may receive a service associated with the camera without installing the camera service app in the display device 100.

Therefore, it is not necessary to change the platform of the display device 100 and to eliminate restrictions on the storage space according to app installation.

In addition, it is possible to provide a camera service differentiated from the related art through bidirectional communication between the display device 100 and the camera device 500.

Figure 10:
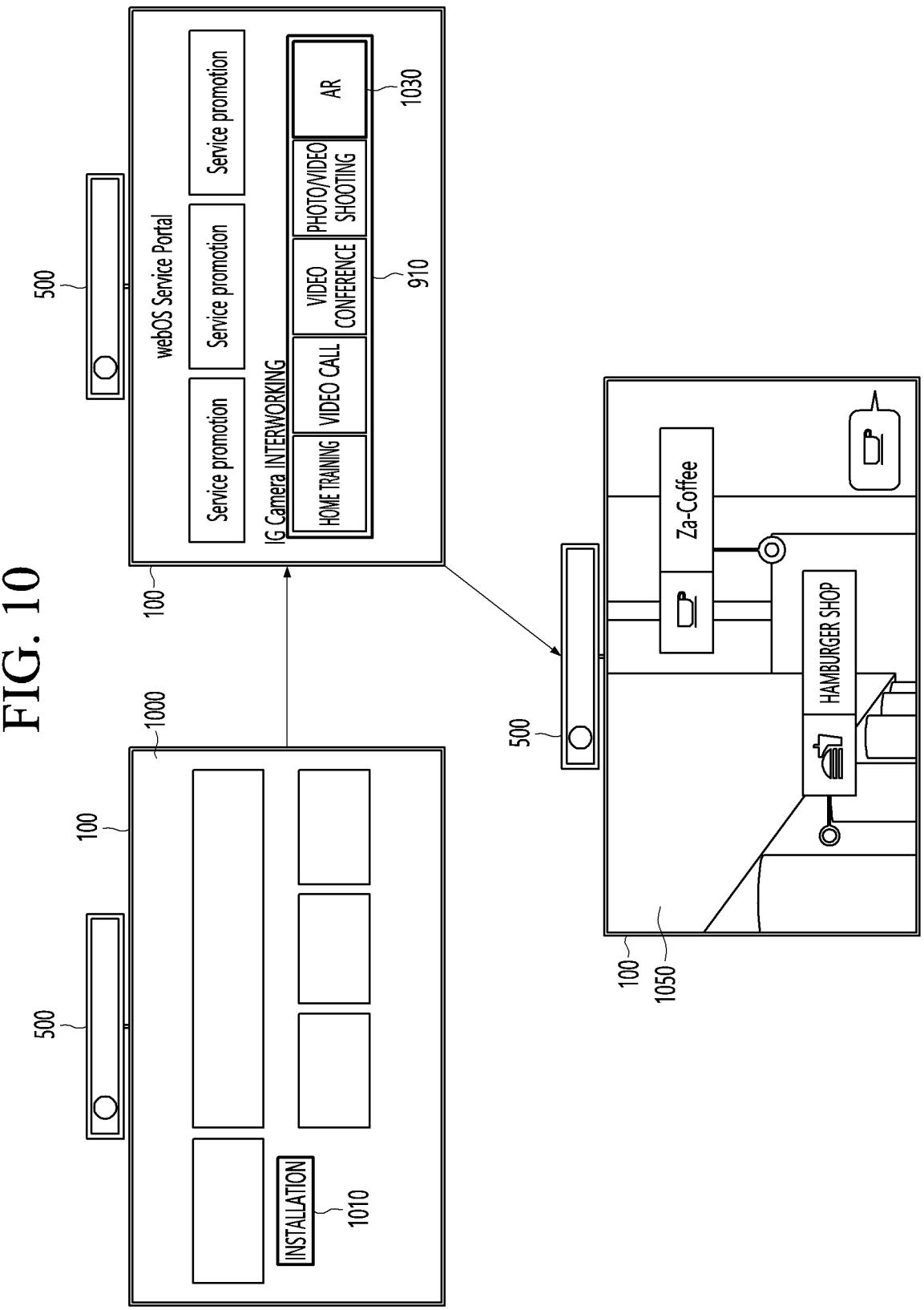
FIG. 10 is a view illustrating an example of adding a new service when a new service item is selected from a camera service list according to an embodiment of the present disclosure.

FIG. 10 is a view illustrating an example of adding a new service when a new service item is selected from a camera service list according to an embodiment of the present disclosure.

When the command for selecting the new service item is received in FIG. 9, the display device 100 may display a new service screen 1000 for providing information on a new service, as shown in FIG. 10.

The new service screen 1000 may include a description information and installation item of a new camera service app. The installation item 1010 may be an item for installing the new camera service app in the camera device 500.

Assume that the new camera service app is an augmented reality (AR) app.

When a command for selecting the installation item 1010 is received, the display device 100 may transmit a command for installing the AR app in the camera device 500 to the app store server 50.

The display device 100 may receive a command for selecting the installation item 1010 from the remote control device 200.

The app store server 50 may transmit program data necessary to install the AR app to the camera device 500 according to the received installation command.

The camera device 500 may install the AR app based on the received program data. When the AR app is installed in the camera device 500, the camera device 500 may transmit a notification that AR app installation is completed to the display device 100 through the wired communication interface 520.

The display device 100 may receive the notification that AR app installation is completed from the camera device 500 or the app store server 50, and display an AR item 1030 corresponding to the AR app on the camera service list 910.

When the AR item 1030 is selected, the display device 100 may transmit an execution command of the AR app to the camera device 500 and display an AR app execution screen 1050 based on an image signal received from the camera device 500.

According to the embodiment of the present disclosure, a user may receive a new camera service without installing an app for the new camera service in the display device 100. Therefore, whenever the new camera service is released, it is possible to reduce the burden of installing the app in the display device 100 and it is not necessary to upgrade the display device 100.

Figure 11:
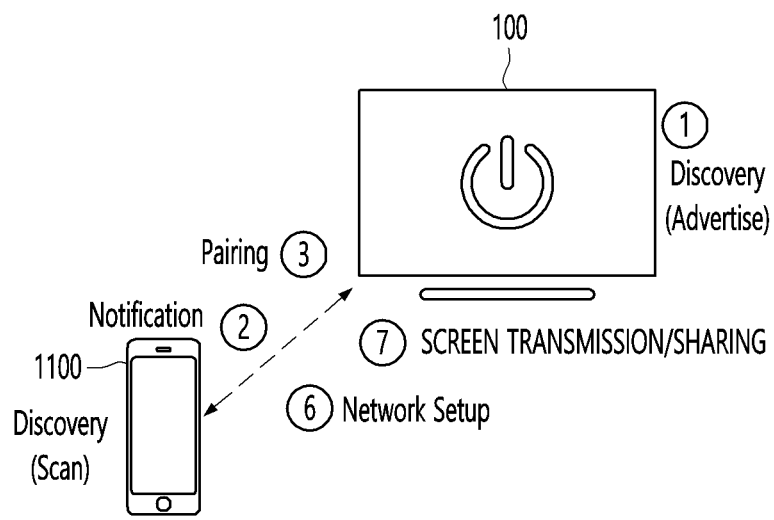
FIG. 11 is a view illustrating a process of connecting a display device and an external device through wireless network communication according to the related art.
Figure 12:
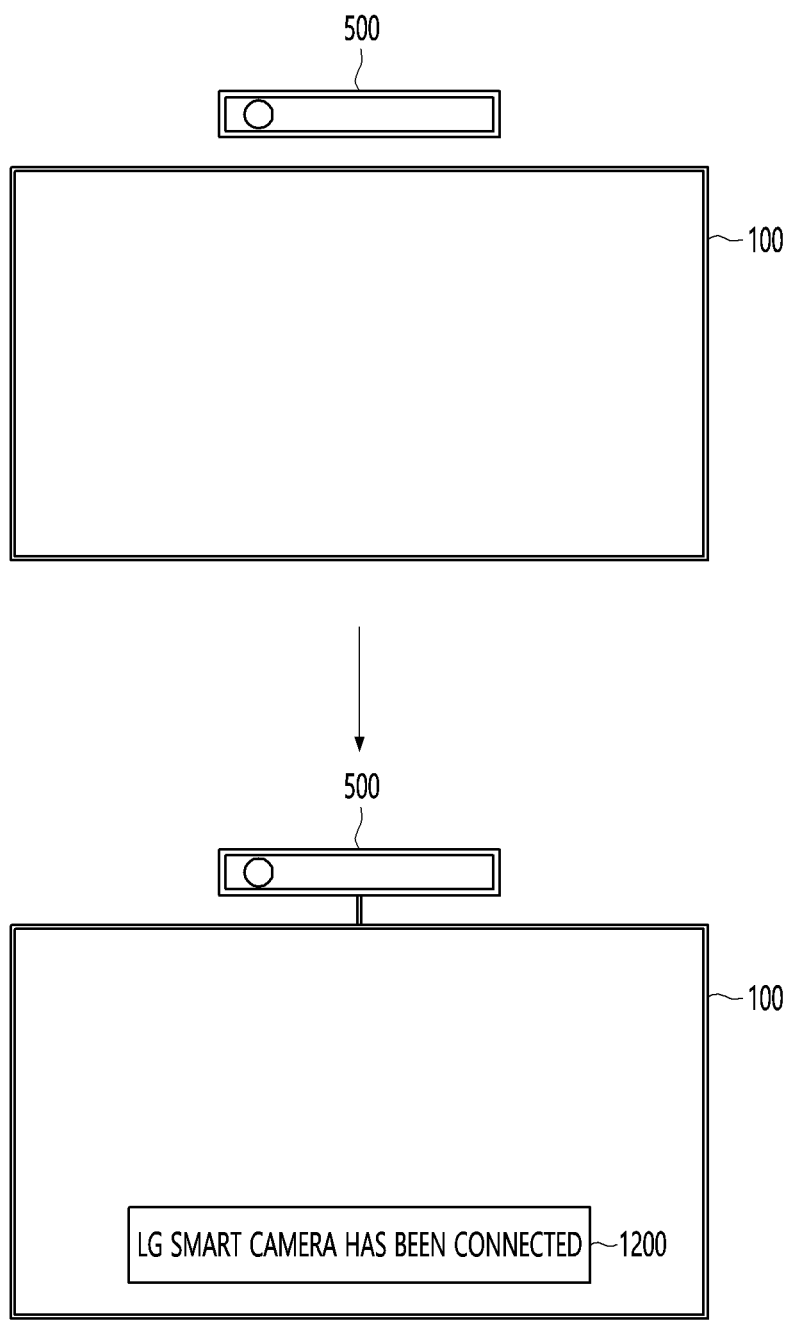
FIG. 12 is a view illustrating a process of connecting a display device and a camera device according to an embodiment of the present disclosure.

FIG. 11 is a view illustrating a process of connecting a display device and an external device through wireless network communication according to the related art, and FIG. 12 is a view illustrating a process of connecting a display device and a camera device according to an embodiment of the present disclosure.

Referring to FIG. 11, a search process and a connection process are largely required for wireless network communication between the display device 100 and the external device 1100.

The search process is a process in which the display device 100 searches for the external device 1100 and may include a notification transmission process and a pairing process (external device registration process).

The connection process may include a network setup process and a process of transmitting a screen to the display device 100.

In the connection process, user operation is necessarily required.

For example, in case of connection through Wi-Fi Direct, entry into a soft AP mode is necessary. For this, a device list is provided and the connection process is performed through user selection.

In addition, in case of connection through BLE, device registration is necessary. For this, to device list is provided and the connection process is performed through user selection.

In case of connection through NFC, the connection process is performed by manually touching an NFC tag.

In case of connection through a QR code, a process of providing the QR code and establishing connection by enabling the user to shoot the QR code through a camera is necessary.

In this way, there is inconvenience that input operation of the user is necessarily required for connection between the display device 100 and the external device 1100.

Referring to FIG. 12, the display device 100 and the camera device 500 are in a disconnected state.

When the external device interface unit 135 of the display device 100 and the wired communication interface 520 of the camera device 500 are connected through the HDMI cable, the display device 100 may display a popup window 1200 for displaying that the camera device is connected.

After the popup window 1200 is displayed, step S701 of FIG. 7 may be sequentially performed.

When the display device 100 and the camera device 500 are connected through HDMI-CEC, the display device 100 may transmit a network setting value to the camera device 500.

The network setting value (or network setting data) may include an SSID and a password for accessing a Wi-Fi network (or router).

The size of the SSID may be a maximum of 32 Bytes, and the size of the password may be a maximum of 64 Bytes.

The camera device 500 may access the Wi-Fi network using the SSID and the password, and thus establish a wireless network with the display device 100.

According to the embodiment of the present disclosure, when the camera device 500 is connected, the display device 100 may provide a connection guide popup and automate network setting, thereby minimizing additional network setting operation.

That is, the user does not need to perform additional operation for setting a separate network between the display device 100 and the camera device 500, thereby improving convenience.

FIG. 13 is a view illustrating a method of transmitting network setting data transmitted to a camera device through HDMI-CEC according to an embodiment of the present disclosure, and FIG. 14 is a view illustrating the format of network setting data according to an embodiment of the present disclosure.

The display device 100 and the camera device 500 may share mutual vendor information (manufacturer information), upon connection through HDMI-CEC.

Upon connection with the camera device 500 through HDMI-CEC, the display device 100 may include the network setting data in a vendor specific command transmitted to the camera device 500 and transmit it to the camera device 500.

Since the size of user data which may be used in vendor specific command of the HDMI-CEC protocol is 13 Bytes. Since the maximum total size of the SSID and the Password is 96 Bytes, the network setting data may be divided at least 8 times and transmitted to the camera device 500.

Referring to FIG. 14, the format of the network setting data is shown.

The network setting data 1400 may be named router information AP info.

The network setting data 1400 may be composed of a combination of SSID, Password, security type and Is Hidden.

The security type may represent a security type and Is Hidden may represent whether the network setting data is hidden.

According to an embodiment of the present disclosure, a user may receive a service associated with a camera without installing a camera service app in a display device. Therefore, it is not necessary to change a platform such that the display device provides a camera service, and it is possible to eliminate restrictions on a storage space according to app installation.

In addition, it is possible to reduce the burden of installing an app in the display device whenever a new camera service is released, and it is not necessary to upgrade the display device.

In addition, the user does not need to perform additional operation for network setting between the display device and the camera device, thereby improving convenience.

According to the embodiment of the present disclosure, the above-described method may be implemented as processor-readable code on a processor-readable medium having a program recorded thereon. Examples of the processor-readable medium include a ROM, a RAM, a CD-ROM, a magnetic tape, a floppy disk, an optical data storage, and a carrier wave (e.g., data transmission over the Internet).

In the display device described above, the configuration and method of the above-described embodiments are not limitedly applicable, but all or some of the above-described embodiments are selectively combined so that various modifications can be made.

What is claimed is:

1. A display device comprising:
a display;
a network interface configured to wirelessly communicate with a camera device or a server;
an external device interface configured to communicate with the camera device through high definition multimedia interface-consumer electronics control (HDMI-CEC); and
a controller configured to:
control the display to display a camera service list including a plurality of camera service items respectively corresponding to a plurality of camera service apps upon connection with the camera device;
in response to selection of a camera service item of the plurality of camera service items, transmit, to the camera device, an execution request of a camera service app corresponding to the selected camera service item;
couple an external input to the camera device according to the execution request;
receive, from the camera device, an information on the camera service app installed in the camera device through a Wi-Fi module included in the network interface; and
receive, from the camera device, an image of the executed camera service app through an HDMI interface included in the external device interface.

2. The display device of claim 1, wherein the controller is further configured to control the display to display the image, and change the displayed image into a previously displayed content image according to a command for ending the coupling of the external input to the camera device.

3. The display device of claim 1, wherein the controller is further configured to, in response to selection of a new camera service item of the plurality of camera service items, transmit, to the server, a request for installing a new camera service app corresponding to the selected new camera service item in the camera device.

4. The display device of claim 1, wherein the controller is further configured to transmit network setting data to the camera device through the HDMI-CEC for wireless communication based on the camera device being connected through the HDMI-CEC.

5. The display device of claim 4, wherein the network setting data includes a service set identifier and a password for accessing a router.

6. The display device of claim 4, wherein the controller is further configured to divide the network setting data a plurality of times and transmit the divided network setting data to the camera device.

7. The display device of claim 1, wherein the controller is further configured to control the display to display a popup window for displaying the connection of the camera device based on the camera device being connected.

8. The display device of claim 1, wherein data having a small data size are exchanged through the Wi-Fi module, and data having a large data size are transmitted to the display device through the HDMI interface.

9. The display device of claim 8, wherein the data having the small data size include interworking data, and the data having the large data size include video data.

10. A method of operating a display device including a network interface configured to wirelessly communicate with a camera device or a server and an external device interface configured to communicate with the camera device through high definition multimedia interface-consumer electronics control (HDMI-CEC), the method comprising:
displaying a camera service list including a plurality of camera service items respectively corresponding to a plurality of camera service apps upon connection with the camera device;
in response to selection of a camera service item of the plurality of camera service items, transmitting, to the camera device, an execution request of a camera service app corresponding to the selected camera service item;
coupling an external input to the camera device according to the execution request;

receiving, from the camera device, an information on the camera service app installed in the camera device through a Wi-Fi module included in the network interface; and receiving, from the camera device, an image of the executed camera service app through an HDMI interface included in the external device interface.

11. The method of claim 10, further comprising displaying the image and changing the displayed image into a previously displayed content image according to a command for ending the coupling of the external input to the camera device.

12. The method of claim 10, further comprising, in response to selection of a new camera service item of the plurality of camera service items, transmitting, to the server, a request for installing a new camera service app corresponding to the selected new camera service item in the camera device.

13. The method of claim 10, further comprising transmitting network setting data to the camera device through the HDMI-CEC for wireless communication based on the camera device being connected through the HDMI-CEC.

14. The method of claim 13, wherein the network setting data includes a service set identifier and a password for accessing a router.

15. The method of claim 10, further comprising displaying a popup window for displaying the connection of the camera device based on the camera device being connected.

16. The method of claim 10, wherein data having a small data size are exchanged through the Wi-Fi module, and data having a large data size are transmitted to the display device through the HDMI interface.

17. The method of claim 16, wherein the data having the small data size include interworking data, and the data having the large data size include video data.

* * * * *